United States Patent
Fingersh (10) Patent No.: US 7,471,010 B1
(45) Date of Patent: Dec. 30, 2008

(54) WIND TURBINE TOWER FOR STORING HYDROGEN AND ENERGY

(75) Inventor: Lee Jay Fingersh, Westminster, CO (US)

(73) Assignee: Alliance For Sustainable Energy, LLC, Golden, CO (US)

( * ) Notice: Subject to any disclaimer, the term of this patent is extended or adjusted under 35 U.S.C. 154(b) by 240 days.

(21) Appl. No.: 10/953,995

(22) Filed: Sep. 29, 2004

(51) Int. Cl.
*F03D 3/00* (2006.01)
(52) U.S. Cl. .............................. 290/55; 290/54; 290/53; 290/43; 290/44; 290/4 R
(58) Field of Classification Search .................... 290/55, 290/44, 43, 53, 54, 4 R, 4
See application file for complete search history.

(56) References Cited

U.S. PATENT DOCUMENTS

| 4,311,011 | A | | 1/1982 | Lewis |
| 4,462,213 | A | | 7/1984 | Lewis |
| 7,156,037 | B2 | * | 1/2007 | Borgen ........................ 114/264 |
| 7,224,080 | B2 | * | 5/2007 | Smedstad ..................... 290/43 |
| 7,230,348 | B2 | * | 6/2007 | Poole ........................... 290/55 |
| 7,245,039 | B2 | * | 7/2007 | DuHamel ..................... 290/44 |

FOREIGN PATENT DOCUMENTS

NO    2002 2426    *   5/2003    ................... 290/44

OTHER PUBLICATIONS

Kottenstette, R. and Cotrell, J., "Hydrogen Storage in Wind Turbine Towers: Design Considerations" NREL/CP-500-34759, WindPower 2004 Conf., Mar. 28-31, 2004.

* cited by examiner

*Primary Examiner*—Nicholas Ponomarenko
*Assistant Examiner*—Iraj A Mohandesi
(74) *Attorney, Agent, or Firm*—Paul J. White (57) ABSTRACT

A wind turbine tower assembly for storing compressed gas such as hydrogen. The tower assembly includes a wind turbine having a rotor, a generator driven by the rotor, and a nacelle housing the generator. The tower assembly includes a foundation and a tubular tower with one end mounted to the foundation and another end attached to the nacelle. The tower includes an in-tower storage configured for storing a pressurized gas and defined at least in part by inner surfaces of the tower wall. In one embodiment, the tower wall is steel and has a circular cross section. The in-tower storage may be defined by first and second end caps welded to the inner surface of the tower wall or by an end cap near the top of the tower and by a sealing element attached to the tower wall adjacent the foundation, with the sealing element abutting the foundation.

18 Claims, 5 Drawing Sheets

WIND TURBINE TOWER FOR STORING HYDROGEN AND ENERGY

CONTRACTUAL ORIGIN OF THE INVENTION

The United States Government has rights in this invention under Contract No. DE-AC36-99GO-10337 between the United States Department of Energy and the National Renewable Energy Laboratory, a Division of the Midwest Research Institute.

BACKGROUND OF THE INVENTION

1. Field of the Invention

The present invention relates generally to wind turbines used for generating electricity, and more particularly, to wind turbine towers modified for storing hydrogen and, in some embodiments, for storing energy for later use or transmittal over the grid.

2. Relevant Background

Around the world, there is an increasing demand for satisfying energy requirements in ways that use less or no fossil fuels. These alternatives need to be reliable, cost effective, and environmentally sound to be adopted on a large scale. For example, as the need to stabilize energy resources increases, many nations and electric utilities are evaluating the increased use of wind as a portion of their power generation mix. Additionally, the use of hydrogen as a "clean" fuel to replace fossil fuels is being seriously considered and investigated by many in the energy industry.

The terms "wind energy" and "wind power" describe the process by which wind is used to generate electricity. Wind turbines convert the kinetic energy in the wind into mechanical power through the use of a rotor that spins a shaft. The shaft is connected to a generator that converts the mechanical power into electricity. The electricity is typically transmitted from the generator to a utility grid for further distribution. The rotor attaches to a hub or nacelle that also houses the generator. The nacelle sits atop a tower, such as a tubular steel or concrete tower or a lattice tower. An ongoing trend is to use taller and taller towers (i.e., 50 to 100 meters or more) because wind speed typically increases with height and more electricity can be generated with the taller towers. The tower not only positions and vertically supports the nacelle and attached rotor but is designed to withstand the strong bending forces created by the rotor.

Wind energy is currently the most cost effective, non-hydro, renewable energy source, but a number of issues need to be addressed before it will be more widely adopted by nations and utilities. Wind energy is intermittent and is only available when the wind is blowing within a particular range of wind speeds, i.e., the turbine cannot operate at wind speeds below a minimum speed and cannot be safely operated above a maximum speed. Hence, the energy from the wind turbine is only available intermittently. Further, wind power is seasonal in many areas of the world with stronger winds occurring in one season or another depending on the location. Another issue with wind energy is that wind energy is inherently not dispatchable because the output of wind farms, i.e., collections of wind turbines, is a function of wind speed, and the utilities cannot control wind speed. Dispatchability refers to the ability to control output, and this is important because energy users and not the utility control the load on a grid. Hence, the utilities must control power injected into the grid by power generators (such as wind farms) to set it equal to the power withdrawn from the grid by end users. Since wind power does not presently lend itself to control, utilities must include other more dispatchable sources of energy. Another issue with adopting wind energy is cost. Other sources of energy are consistently less expensive for providing electricity to a utility grid, and wind energy is often only included in a grid when its use is subsidized by governments or users. These and other issues must be addressed before wind energy will be used to provide a large portion of electricity on a utility grid.

More recently, there has been a large push by the United States and other nations to move to an integrated hydrogen economy in which hydrogen is used as a fuel in automobiles and even as a fuel for generating electricity. While hydrogen may be generated in a number of ways, a growing trend is to convert water by electrolysis to produce hydrogen. In this regard, an electrolyzer uses an electric current to separate water into hydrogen and oxygen. Many have suggested that renewable energy sources, such as wind, should be used to provide the electricity that in turn can be used to produce the hydrogen for use as a fuel. When a wind turbine is used to produce the hydrogen, the hydrogen can be used to drive a fuel cell or combination device which can convert hydrogen into electricity.

As with wind energy, there are a number of obstacles that must be overcome to facilitate adoption of hydrogen as a useful alternative to fossil fuels. For example, the production of electricity with fuel cells is relatively expensive when compared with other sources of electricity. Specifically, during the wind-electricity-hydrogen-electricity cycle proposed by many to address the intermittent nature of wind energy, a number of inefficiencies and losses occur in existing technologies such that the electricity produced by the fuel cell from hydrogen is much more expensive than can be obtained from other grid sources. In other words, the cost of electricity from the stored chemical energy in the form of hydrogen is higher than the initial electricity generated by the wind turbine, which is already generally higher than other grid sources.

Storage and distribution of the hydrogen creates another challenge. In some cases, generated hydrogen is transmitted as it is produced via a pipeline, but this involves pumping or compression costs to raise the pressure of generated hydrogen to that of the pipeline. In other cases, a separate pressure vessel is positioned near the electrolyzer to store the hydrogen for later distribution or use by a fuel cell. The compression and storage costs of the hydrogen can be significant and must be considered when analyzing hydrogen production and storage concepts. For example, the cost of pressure vessels for storing hydrogen for driving a fuel cell must be considered when determining the cost of associated with generating electricity from the stored or reserve energy for a wind farm.

Hence, there remains a need for improved methods and systems for generating electricity from wind that addresses the issues of cost, reliability, and dispatchability. Also, there is a need for improved methods and apparatus for generating, storing, and distributing hydrogen. Preferably, such methods would build upon existing wind and hydrogen technology while reducing costs and improving efficiencies.

SUMMARY OF THE INVENTION

The present invention addresses the above problems by providing a method and tower configurations for storing pressurized hydrogen or other gases within a tubular steel tower. Standard tower walls have a circular cross section which provides excellent hoop strength even though the towers are designed with wall thicknesses selected for resisting bending moments and fatigue associated with operating a wind turbine. The invention makes use of the hoop strength of a tower wall to provide an in-tower hydrogen storage or pressure vessel section within the tower. The pressure vessel section is generally defined by the inner surfaces of the tower wall and one or two end caps that are welded within the tower. Joints in the pressure vessel are sealed, and in some cases, a liner or bladder is provided to provide a barrier between the steel of the tower and caps and stored hydrogen. The hydrogen is generated by a battery selectively used for storing energy from the wind turbine or discharging stored energy (i.e., a nickel hydrogen battery) and/or by an electrolyzer used for storing energy in the form of hydrogen. In the latter example, a fuel cell or combustion device may be provided for converting the stored hydrogen back into electricity for distribution to an end user or to a utility grid. Alternatively, the stored hydrogen may be discharged for use as a fuel at a remote location (i.e., transmitted via pipeline or other methods for sale as an alternative fuel).

More particularly, a wind turbine tower assembly is provided for storing compressed gas. The tower assembly includes a wind turbine assembly having a rotor, a generator driven by the rotor, and a nacelle housing the generator. The tower assembly also includes a structural foundation and a tubular tower. The tubular tower has one end mounted to the foundation and another end that is attached to and supports the nacelle. The tubular tower includes an in-tower storage that is configured for storing a pressurized gas such as hydrogen and that is defined at least in part by inner surfaces of the tower wall. In one embodiment, the tower wall is steel and has a circular cross section. The in-tower storage may be defined by first and second end caps welded or sealably attached to the inner surface of the tower wall or by an end cap near the top of the tower and by a sealing element attached to the tower wall adjacent the foundation, with the sealing element laying on or abutting the foundation. The in-tower storage may include sealing elements at each mechanical joint in the wall defining the in-tower storage and/or a liner or bladder made of material(s) substantially impervious to hydrogen isolating the hydrogen in in-tower storage from steel in the wall and end caps and sealing elements.

According to another aspect of the invention a method is provided for operating a wind turbine tower system. The method includes designing, fabricating, and providing an elongated support tower with a wall that has a circular cross section. The tower includes a pressure vessel section defined by a length of the wall and an end cap sealed about its circumference to one end of the length of the wall. The method further includes mounting the support tower on a foundation and mounting a wind turbine assembly on an end of the support tower distal to the foundation. The wind turbine assembly includes a rotor, a generator driven by the rotor, and a housing for the generator. An energy storage system is linked to the generator via a transmission line and is fluidically linked to the pressure vessel section. The wind turbine is operated to generate electricity that is transmitted on the transmission line, and the energy storage system is used to store energy. As part of the energy storage, hydrogen is generated and stored in the pressure vessel section.

In one embodiment, the energy storage system includes a battery, such as nickel hydrogen battery, and the operation of the energy storage system includes charging the battery which results in hydrogen being output from the battery. The method may then also involve converting the stored energy into electricity, which in this embodiment involves discharging the battery and concurrently reabsorbing some of the stored hydrogen from the pressure vessel section. In another embodiment, the energy storage system includes an electrolyzer for generating hydrogen that is stored within the pressure vessel section. The hydrogen may be discharged for use as fuel as part of the method and/or the method may include using a fuel cell and/or combustion device to convert at least a portion of the stored hydrogen into electricity. The electricity produced by the fuel cell, combustion device, and battery is selectively transmitted to a utility grid or to another energy user. According to the method, the operation of the energy storage system to store energy and to convert stored energy into electricity may be selectively controlled in response to demands on or requirements of a utility grid. In this manner, the energy storage system may provide enhanced dispatchability by allowing the wind turbine to operate when wind is available and using the energy storage system to store energy when demand is lower and to provide additional energy when demand is higher.

DETAILED DESCRIPTION OF THE PREFERRED EMBODIMENTS

The present invention is directed to wind turbine towers or tower systems configured for storing hydrogen within the tower structure itself and also for generating the stored hydrogen and in some embodiments, for generating electricity using the stored hydrogen. Briefly, the tower of modern, utility-scale wind turbine tower systems are typically steel structures with a circular cross section that in addition to supporting a rotor is adapted according to the invention to store a compressed gas, such as hydrogen. To achieve this functionality, the tower is modified by providing, such as by welding, two pressure vessel caps or end bells within the tower and when necessary, reinforcing the side walls with additional material and providing sealing elements (e.g., at flanged joints in the tower). Additionally, the invention builds on the proximity of the hydrogen and electrical support equipment to the wind turbine to improve efficiencies by connecting this equipment, at least in one embodiment, to the DC bus of the wind turbine power converter. This arrangement avoids the losses and inefficiencies associated with many prior hydrogen and hydrogen-based electricity generation designs that include multiple power conversions that each result in losses and that are subject to line and other losses.

The use of the tower for as a pressure vessel for storing hydrogen or other gases results in a cost and energy savings when compared with the use of standalone pressure vessels. The incremental cost of modifying the tower to store hydrogen is significantly less, i.e., about one third the cost, than providing a separate pressure vessel and associated equipment. Energy is saved because the volume provided by a typical tower is so large that a large quantity or mass of hydrogen or other gas can be stored at lower pressures than required of a smaller, standalone pressure vessel, thereby saving energy required for compression of the gas.

Figure 1:
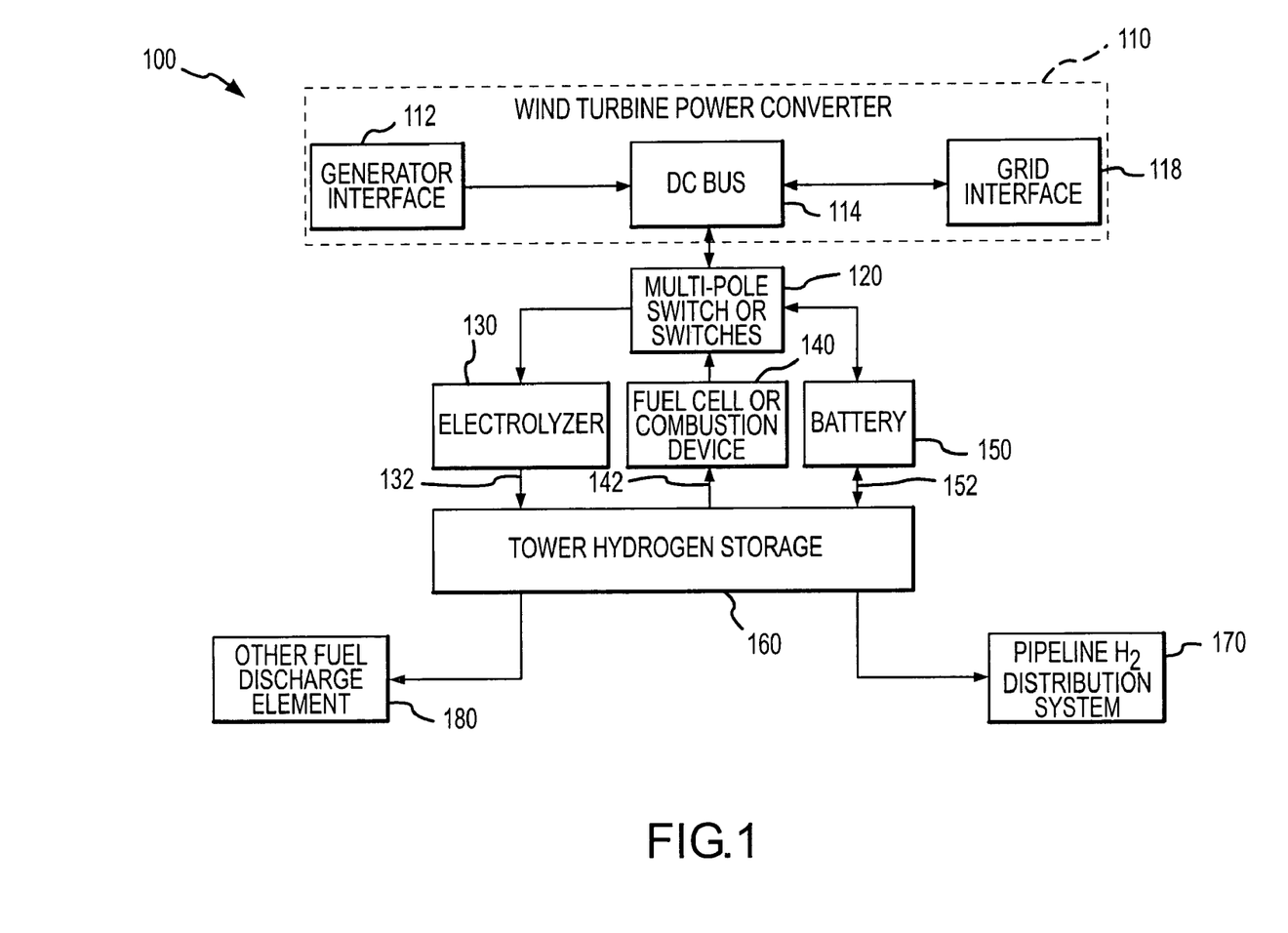
FIG. 1 is a simplified block diagram of a wind turbine tower-based hydrogen and energy storage and distribution system according to the present invention.

The following description begins with a discussion of a system of storing hydrogen or other pressurized gas within a wind turbine tower with reference to FIG. 1. The system also includes features for generating the hydrogen for storage, for generating electricity using the stored hydrogen, and for distributing the hydrogen for use as a fuel. The description then continues with reference to FIGS. 2-4 with more particular discussions of wind turbine tower systems configured according to the invention showing various techniques for modifying towers for pressurized gas storage and for making use of the stored hydrogen. Finally, with reference to FIG. 5, a method of designing, fabricating, and operating a wind turbine tower system with in-tower hydrogen storage is described in detail.

FIG. 1 illustrates in block form a wind turbine tower system 100 with in-tower hydrogen storage. One of the challenges of using wind power is how to use wind in a manner that proves economically sound while also meeting the need for dispatchability (i.e., allowing a user such as a utility to rapidly control its output). The system 100 provides one embodiment that allows wind power to be firmed up economically and to be dispatchable by providing onsite hydrogen production and storage and by providing onsite energy storage and electricity production in addition to that produced by the wind turbine. The system 100 encludes several operating modes including producing hydrogen for distribution as an alternative fuel, producing hydrogen for use within the system 100 to produce electricity such as with a fuel cell, and producing electricity on demand with a battery or battery system which uses the hydrogen storage to operate (i.e., a nickel hydrogen or similar battery design). Once these various modes of operation are understood, it will be clear that each can be used alone or in nearly any combination to practice the invention and to suit a particular implementation. For example, it may be useful to stress the dispatchability aspects provided by a battery system for on-grid applications with the use of a fuel cell for producing electricity when the wind turbine is not operating may be useful for remote or off-grid applications.

As shown in FIG. 1, the system 100 includes a wind turbine power converter 110 and components linked to this converter 110 for storing energy (i.e., chemical energy in the form of hydrogen and a charged battery), for converting stored energy into electricity, and for distributing produced hydrogen. In other words, the system 100 can be thought of as including an energy conversion portion, an energy storage/production portion, and a hydrogen distribution portion. The system 100 would typically be provided as part of a standard wind turbine tower system, which includes a cylindrical tower, a hub or nacelle positioned upon the top of the tower supporting an attached rotor, a drive assembly, a generator connected to the drive assembly producing electricity, i.e., alternating current (AC), and a yaw system for positioning the hub and rotor relative to existing wind conditions. These components are not shown in FIG. 1 but are well understood by those in the arts and are shown and explained in more detail with reference to FIGS. 2-4.

The energy conversion portion is represented by the wind turbine power converter 110 and includes a generator interface 112, a DC bus 114, and a grid or user interface 118. The generator interface 112 generally functions to convert electricity generated by the generator from AC to direct current (DC) and may include a rectifier. The interface 112 is connected to the DC bus 114 which carries the produced electricity or DC from the generator to the grid or user interface 118 at which point the produced electricity is typically conditioned or converted for use on a utility grid or by another end user, e.g., the DC may be converted back to AC at a desired frequency. The generator interface 112 may be positioned within a wind turbine nacelle and the DC bus 114 runs from the nacelle down to the grid interface 118 which is typically positioned near the base of the tower (within the tower or external to the tower). Of course, the interface 112 may all be in the nacelle, all be down-tower, or have a split location. As noted above, the functioning of the interfaces 112, 118 is not completely efficient, and there are generally losses associated with these devices 112, 118.

In this regard, the inventive system 100 controls such losses by connecting the energy storage/production portion of the system 100 directly to the DC bus 114 rather than downstream of the grid interface or DC-AC converter 118. As shown, a switch, 120, such as a multi-pole switch or switches, selectively connects the DC bus 114 to an electrolyzer 130, a fuel cell or combustion device 140, and a battery 150. When connected, the electrolyzer 130 operates to convert DC from the DC bus 114 (and wind turbine/generator) into hydrogen. The hydrogen is fed via line 132 to tower hydrogen storage 160. As will be explained in detail with reference to FIGS. 2-5, the hydrogen storage 160 is provided by a hydrogen storage system within the tower itself, e.g., end caps or bells are provided within the conical tower to create a highly effective long cylindrical pressure vessel. The particular electrolyzer design used to implement electrolyzer 130 is not limiting to the invention and nearly any electrolyzer configuration may be used to produce hydrogen for storing in the in-tower storage 160. During operation of the system 100, hydrogen from the storage 160 may be distributed via a pipeline hydrogen distribution system 170 or via other fuel/discharge elements 180 (e.g., filling of pressurized vessels carried on train, trucks, and the like or discharge to other electricity generation equipment within a wind farm).

During operation of the system, 100, it may be desirable to convert the stored hydrogen in the tower hydrogen storage 160 to electricity, such as when no current is available from generator interface 112 (i.e., the wind turbine (not shown) is not operating). In this regard, the system 100 is shown to include a fuel cell (or, alternatively, a combustion device) 140 connected to the DC bus via switch 120 and connected to the tower hydrogen storage 160 via line 142 (which may include one or more valves, regulators, and other components useful for selectively providing hydrogen to the fuel cell 140 at desired pressures). As with the electrolyzer 130, the particular design and arrangement of the fuel cell or cell stack 140 is not limiting to the invention as long as the cell 140 is configured to convert hydrogen into electricity for application to the DC bus 114 and transmittal to the user or grid interface 118. In one embodiment, a standard hydrogen fuel cell (such as an acid electrolyte fuel cell) is used for fuel cell 140 that acts to electro-chemically convert a fuel, i.e., hydrogen, to energy (such as DC).

In many preferred embodiments of the invention, it is desirable to create a highly dispatchable system 100 and in these embodiments, a battery 150 is operated to store energy when the wind turbine is operating and to discharge the stored energy when the wind turbine is not operating or simply when the user or grid demand requests more energy than being provided solely by the turbine. The battery 150 may take a number of forms to fulfill this function, and in one embodiment, the battery 150 includes one or more nickel hydrogen batteries. In this embodiment, the switch 120 is operated (such as by a control system shown in FIG. 2) to direct at least a portion of energy available at generator interface 112 to the battery 150 to charge the battery 150 and store energy. In other words, the charging operation may occur concurrently with providing energy to the grid interface 118 (such as when the grid operators indicate that the system 100 should provide less than 100 percent of its energy to the grid or as an ongoing operation to store energy) or as a separate operation. Typically, in such a system, DC bus voltage will control charge and discharge.

During charging, the nickel hydrogen battery 150 operates to discharge hydrogen, which is transmitted via piping (and valves and the like) to tower hydrogen storage 160. Once the energy is stored in battery 150, the switch 120 can be operated to connect the battery 150 to DC bus 114 and grid interface 118 to discharge the battery 150 concurrent with current being provided via generator interface 112 or separately. Because battery 150 can be brought online almost instantaneously, the system 100 provides a much higher degree of dispatchability than prior systems and also, batteries are typically highly efficient at storing and discharging energy, thereby reducing associated losses and lowering the cost of storing energy. During discharging, the piping 152 is opened to allow the battery 150 to draw hydrogen from the tower hydrogen storage 160 and reabsorb hydrogen as necessary to discharge the stored energy. The fuel cell 140 and battery 150 may be positioned within the tower, such as above and/or below the tower hydrogen storage 160, and/or positioned exterior to the tower such as adjacent the tower on the tower foundation or on a separate foundation.

The following discussion further describes the use of hydrogen storage in a wind turbine tower and the use of hydrogen systems to generate electricity and/or batteries to store and generate electricity to improve the reliability and dispatchability of wind energy such as that provided by the system 100. Control is added to wind farm power by adding energy storage. In this way, excess energy can be stored and released when needed. A wind farm or number of wind turbine tower systems can create hydrogen through water electrolysis, store that hydrogen, and then run it through fuel cells or combustion devices to recover the stored energy. In addition to or as alternative, batteries may be used to store energy. Each technique has advantages and disadvantages that are discussed in the following paragraphs.

Wind farm energy can be used to generate hydrogen for sale into a fuels market. In this mode of operation of a wind turbine tower system, the stored energy is recovered remotely and is not regenerated onto the grid. Instead, a vehicle uses the energy (i.e., hydrogen) at a remote location. This mode of operation is attractive because the fuel is supplied by a renewable source, is non-polluting, is domestically generated, and is produced in cost competitive manner and does not compete with low-cost grid energy and is used to replace much more expensive transportation fuels. For example, if gasoline is $1.00/gallon (before taxes) and the engine in an automobile is 15% efficient, the cost of energy at the wheel of the car is $0.20/kWh. Grid energy in the United States is presently only $0.02 to $0.04/kWh. Therefore, if the wind turbine tower system's electrolyzer, fuel transportation, and energy regeneration systems are efficient, wind farms using tower systems according to the invention may be able to generate hydrogen that is able to compete successfully with current transportation fuels.

Figure 2:
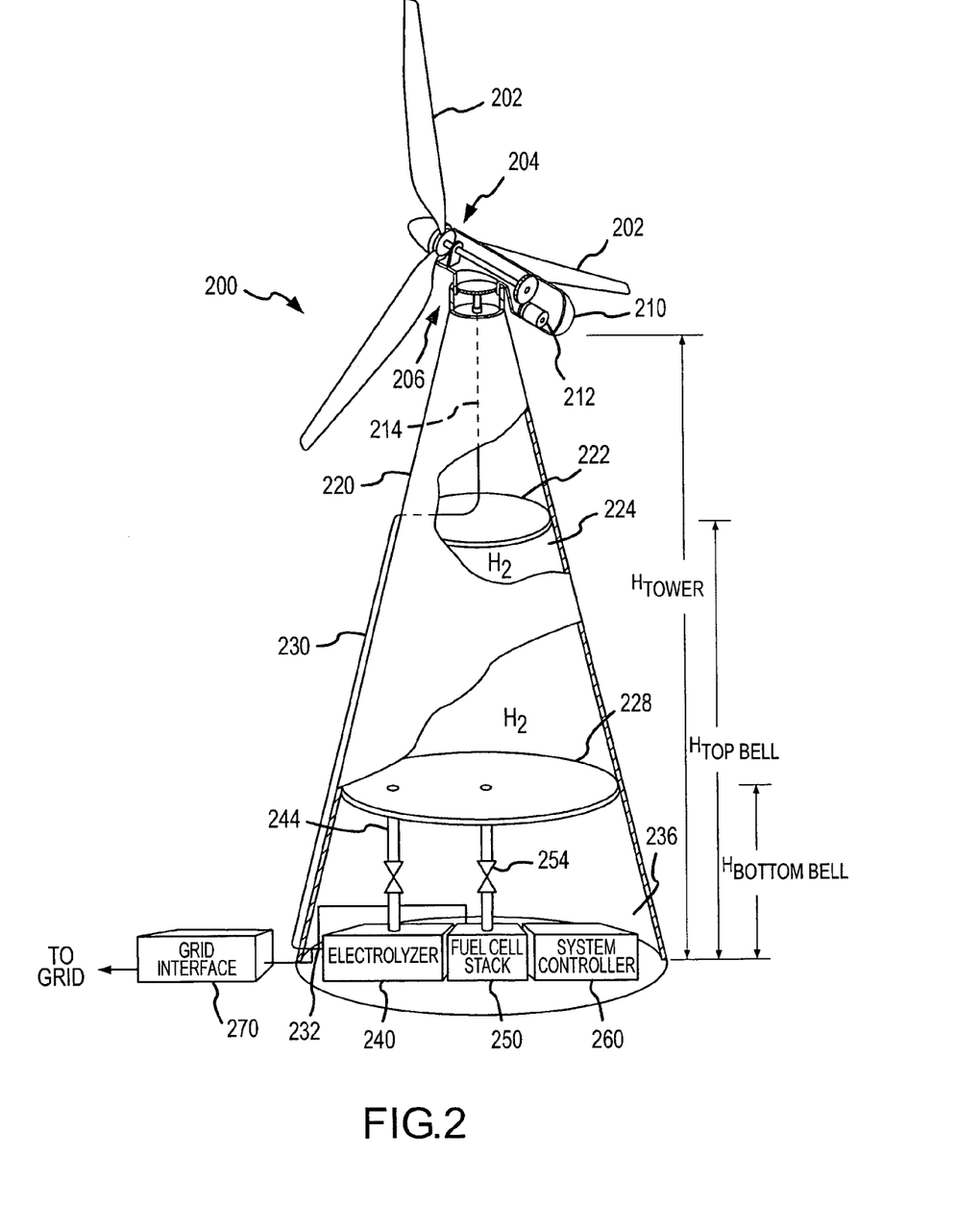
FIG. 2 illustrates a perspective view with cutaways of a wind turbine tower incorporating in-tower hydrogen storage and the energy storage and generation systems of the present invention.

Referring now to FIG. 2, wind turbine tower system 200 is shown according to the present invention. As illustrated, the system 200 includes a rotor 202 supported by the hub or nacelle 210. The nacelle 210 is in turn is supported by a tower 220 and houses a drive assembly 204 which is driven by rotor 202 and provides mechanical or shaft energy to generator 212. Further, a yaw system 206 is provided to position the nacelle 210 and attached rotor 202 in response to wind direction changes. When the rotor 202 spins, the generator 210 operates to generate electricity (e.g., AC) that is transmitted down through the tower 220 via transmission line 214, which is run at least initially within the tower 220 and then above upper end cap or top bell 222 exits the tower 220 and runs along the exterior of the tower 220 in weather resistant conduit 230 to DC bus 232. The DC bus 232 is in turn linked to a grid interface 270 positioned outside the tower 220, to an electrolyzer 240 inside a space 236 within the tower 220 defined in part by the lower end cap or bottom bell 228. Further, a fuel cell stack 250 is shown inside the tower space 236 and is connected to the DC bus. The electrolyzer 240 is shown to be connected via piping and valves 244 to in-tower hydrogen storage 224, and the fuel cell stack 250 is also connected to the hydrogen storage 224 via piping and valves 254. In some embodiments not shown, all or a selected number of these components are located up tower above the hydrogen storage 224. A system controller 260 is also provided within the lower tower space 236 and is configured for selectively operating the various components of the system 200 including the rotor 202, yaw assembly 206, electrolyzer 240, fuel cell stack 250, any switches or controls (not shown) used to direct electricity on DC bus 232, and piping and valves 244, 254. Although not shown, a discharge line and associated valves may be provided to discharge hydrogen from storage 224 and the controller 260 may optionally be used to control such discharge by selective operation of one or more discharge valves. Although not shown, a personnel ladder, lift, or the like would be provided external to the tower (at least adjacent the storage 224) to allow access to the hub 210.

Significantly, the tower 220 is configured to provide a large volume of storage for a pressurized gas. In the system 200 illustrated, the electrolyzer 240 is operated with electricity from the DC bus 232 generated by the generator 212 and uses the electricity to generate hydrogen that is transmitted through piping 244 to in-tower hydrogen storage 224. The storage 224 is defined by the interior surfaces of tower 220 between an upper end cap or top bell 222 and a lower end cap or bottom bell 228. The end caps 222, 228 are affixed to the interior surfaces of the tower 220 walls to provide a gas tight seal, such as by welding or other techniques known in the arts.

In the embodiment of FIG. 2, the tower 220 has a height, $H_{tower}$, and the storage 224 is provided between an end cap 222 positioned at a top bell height, $H_{top\ bell}$, which is typically near but a small distance (such as 5 to 20 meters or more) below the full tower height, $H_{tower}$, and an end cap 228 a height or distance, $H_{bottom\ bell}$, above the base or foundation of the tower 220. The position of the caps 222; 228 can vary significantly to practice the invention and to suit the need for room in the lower tower space 236 or in the space above the upper cap 222 and to suit the need for a larger or smaller volume in the hydrogen storage 224. While not shown, seal elements may be provided within the storage 224 to provide a gas tight volume. For example, the flanged connections along the wall of the tower 220 between caps 222, 228 may be sealed, such as with gaskets, welded bands, or any other useful technique. Further, in some cases (such as the system 400 of FIG. 4), it may be desirable to provide a bladder or inner seal member that provides a barrier between the hydrogen in the storage 224 and the interior surfaces of the tower 220 walls and the caps 222, 228 to maintain the cleanliness of the hydrogen and to avoid potential problems with hydrogen embrittlement, hydrogen attack, or other corrosion induced by the pressurized hydrogen interacting with structural members (which are typically carbon steel or the like).

As shown in FIGS. 1 and 2, the use of in-tower hydrogen storage (such as storage 160, 224) can play an important role in the expansion of a hydrogen economy. For in-tower storage of hydrogen to be adopted, the system and tower design must be both technically adequate as well as cost effective. A study was completed to verify the feasibility of in-tower hydrogen storage. In the study, fuel cells were assumed to be the hydrogen consumption device, thus not requiring a high feed pressure (as may be the case for a pipeline discharge from tower storage). It was assumed that electrolyzers would be the source of stored hydrogen in the turbine towers. Typically, electrolyzers including proton exchange membrane (PEM), high-pressure alkaline electrolyzers, and the like output hydrogen at pressures approaching 15 atmospheres. As is discussed below, hydrogen is preferably stored at maximum pressures below 15 atmospheres, and hence, the use of electrolyzers to produce hydrogen for tower storage does not require additional compression of the hydrogen and this avoids added compression costs.

In the study, a 1.5 MW tower was used as the baseline tower. The tower was constructed of tubular steel and was configured to withstand peak and fatigue bending moments at the two ends of the tower. The baseline tower was assumed, as is often the case, to have a linear taper of diameter (i.e., smaller diameter near the nacelle) and wall thickness with a constant tower diameter to wall thickness ratio of 320. The structural steel was assumed to have a yield strength of 350 MPa, and the cost of the tower was estimated to be $1.50/kg. Other costs included were a personnel ladder and tower access door. The tower was assumed to have a height of 84 meters, a base diameter of 5.66 meters, a top diameter of 2.83 meters, a base wall thickness of 17.4 mm, and a top wall thickness of 8.7 mm.

An important feature of the invention is that the pressurizing of the tower, such as tower 220 within the storage area 224, utilizes the strength of the tower walls in a manner that does not detrimentally effect the bending and fatigue strength for which the tower was designed. In other words, the addition of the storage area 224 and pressurization of the tower with hydrogen utilizes the basically free and unused hoop strength provided by the conical shaped tower. In some cases, additional material or wall thickness (i.e., tower reinforcement) is provided to allow pumping to a higher pressure (e.g., a determined maximum pressure for economical operation) but the cost of this additional material is relatively insignificant when compared with the cost associated with the alternative storage technique of providing a standalone pressure vessel.

More particularly, it should be understood that pressurizing the interior of a wind turbine tower creates added or new structural forces that must be considered in implementing systems according to the invention. A pressurized tower of the invention must be able to not only withstand loads generated by normal operations of the rotor but also loads generated by becoming a long, cylindrical pressure vessel. Conventional tubular towers for modern wind turbines are generally designed based on fatigue strength (such as at welds), and hence, the study of modifying a conventional tower fully considered the impact on fatigue strength including welds for pressurizing the tower while also verifying compliance of storage (such as storage 224) with pressure vessel standards. Pressurizing produces differing stresses, i.e., the pressure is uniform and causes loads in the axial direction and in the plane normal to the tower's central axis. Axial stresses induced in cylindrical pressure vessels are half the magnitude of stresses (i.e., hoop stresses) induced in the plane normal to the tower axis. Hence, pressure vessel loads cause the ultimate strength of the tower walls to be a limiting design constraint for the pressure vessel-type tower. Further, when crack propagation theory is considered, a crack in a turbine tower would primarily propagate when a tensile stress is applied perpendicular to the crack's length. As a result, stresses in the hoop direction would likely have little effect on fatigue in the axial direction.

When a tower is pressurized, though, the large surface area over which pressure is applied results in significant added axial tensile stresses, even at relatively low pressures. For example, in the exemplary tower of the study, the tensile stress induced by one atmosphere above gauge pressure is nearly four times the magnitude of the compressive stress caused by the entire weight of the wind turbine. A number of techniques may be used to determine if and how much reinforcement should be provided to maintain a tower at its designed fatigue life (i.e., life expected if only subjected to standard turbine operations). For example, an equation based on the Goodman equation can be used to determine the increase in wall thickness that would be useful for maintaining a tower's fatigue life (e.g., $t_2 - t_1 = pr/2S_{ut}$ where $t_2$ is the thickness of the pressurized portion of the tower, $t_1$ is the thickness of an non-pressurized or standard tower, p is gauge pressure, r is the radius of the tower, and $S_{ut}$ is the ultimate tensile strength).

While the above reinforcement determination provides continuing fatigue strength, the pressure of tower storage can increase to a point where the primary mode of failure for the tower walls changes from fatigue to bursting. After this transitional pressure, the required wall thickness for the tower storage should be determined by maximum allowable hoop stress rather than axial fatigue as discussed above (e.g., maximum allowable stress for a pressure vessel is less than the ultimate tensile strength divided by 3.5 according to the ASME Pressure Vessel Code). The transitional pressure for a particular tower configuration can be defined using graphical techniques graphing hoop and fatigue stresses for a tower (such as bottom, top, and other local stresses) on a wall thickness versus pressure graph. With this process, the transitional pressure is defined as the point where the line describing maximum stress requirements overtakes the line describing fatigue requirements. Below the transitional pressure (or, as later described, the maximum tower pressure for hydrogen storage), the required wall thickness is determined by the fatigue requirements, and above, by the burst strength requirements. While the transitional pressure should be determined for each tower configuration, it is likely that most utility-scale towers will have a transitional pressure between about 1 and about 1.5 MPa (or 10 to 15 atm). Hence, in some preferred embodiments of the invention, a maximum tower pressure is set at about this transitional pressure for the tower such that any tower reinforcement requirements can be determined based solely on fatigue limitations of the tower. Further, because smaller radius towers can more readily withstand higher pressures and wall reinforcement is less costly than end caps, longer and smaller radius tower storage areas may be preferable. For example, if less than all the tower is configured as in-tower storage, it may be useful to place the top or upper cap nearer the hub or nacelle and position the bottom or lower cap as a position within the tower to obtain a desired volume.

Returning to the study performed on modifying a conventional 1.5 MW tower for hydrogen storage, it was determined that the primary cost increases are associated with structural changes associated with the added internal pressures. These costs include reinforcing the tower walls, installing pressure vessel end caps (sized according to pressure vessel standards), and providing for sealing of the in-tower storage. It was assumed that reinforcing a tower by thickening tower walls without other structural changes increases material costs but not forming costs. Additional costs may be associated with a new tower design such as the addition of an external conduit for transmission lines, new/different access doors, and providing for maintenance access to the hub (e.g., an external personnel ladder, lift, or the like). The study also determined a cost/mass of stored hydrogen, and based on these results, the use of in-tower hydrogen storage is more economical than storing hydrogen in a standalone pressure vessel. This is particularly true when the maximum tower pressure is maintained below the transitional or cross over pressure for the tower design (which limits compression costs as electrolyzers output hydrogen at adequate pressures and limits additional reinforcement costs associated with burst failure requirements), and when storage is below the transitional pressure, tower storage is expected to cost about one third of equivalent storage in a separate, standalone pressure vessel.

Figure 3:
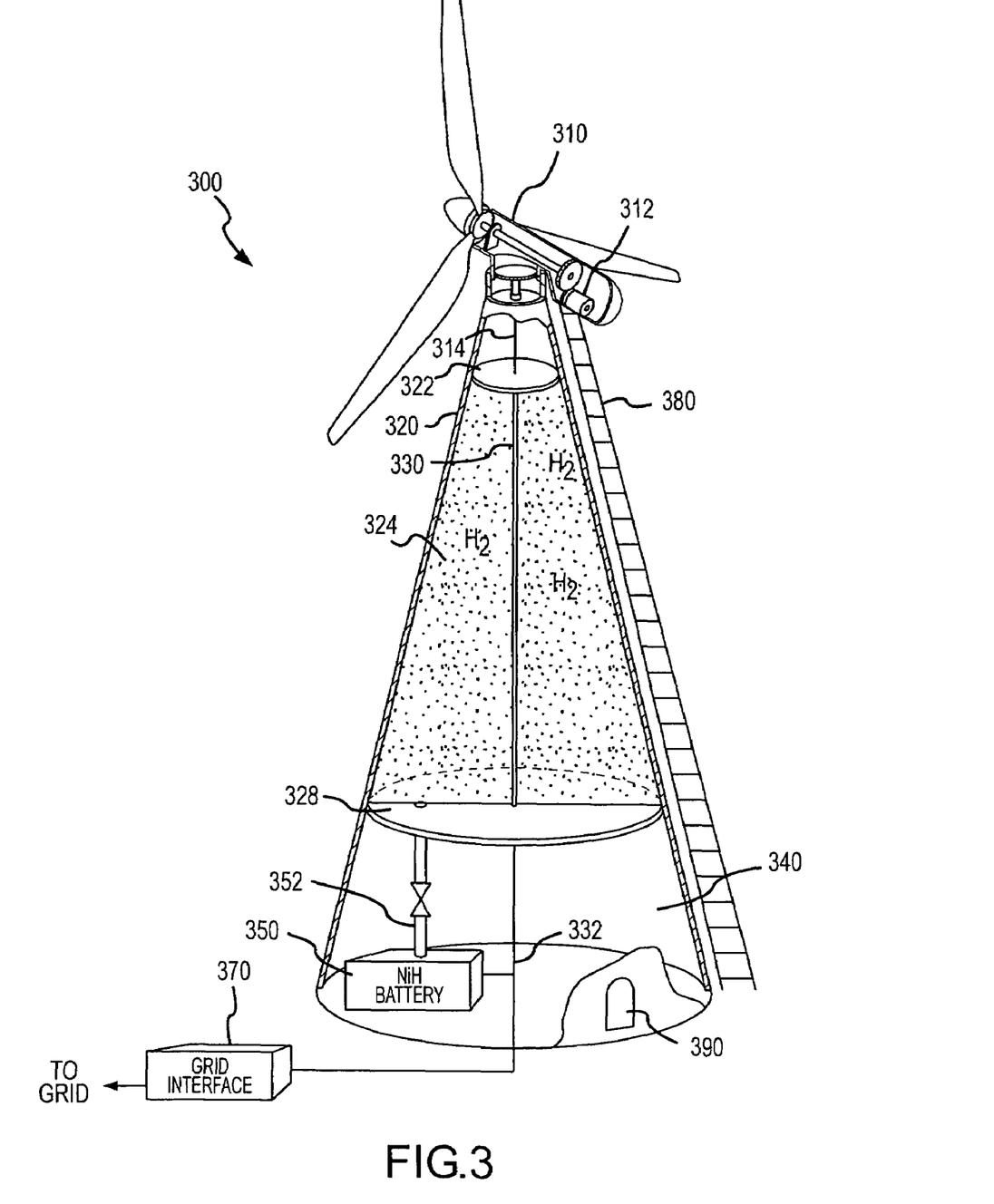
FIG. 3 illustrates another embodiment of a wind turbine tower of the present invention including an in-tower hydrogen storage system for use, in this exemplary embodiment, with a battery that generates hydrogen when being charged and absorbs hydrogen when discharging stored energy.

FIG. 3 illustrates another wind turbine tower system 300 according to the invention for storing a pressurized gas, such hydrogen, within a modified tower. The system 300 is shown in a somewhat simplified manner relative to the system 200 of FIG. 2 but it will be understood the rotor and other related components provided in system 200 are being left off for simplicity. The system 300 is configured for in-tower hydrogen storage as is system 200 but differs in that the transmission line is run through the in-tower storage and also by showing a system that utilizes a nickel hydrogen battery rather than an electrolyzer/fuel cell combination (although these could be added to system 300 (as is shown in system 100) or the battery of system 300 could be added to system 200).

As shown, the system 300 includes a nacelle 310 housing a generator 312 which operates to generate electricity that is transmitted from the nacelle 310 in transmission line 314. Maintenance of the system 300 is achieved via access ladder (or lift) 380 and access door 390. The system 300 includes a tower 320, such as a tubular steel tower with a conical or cylindrical cross section having a tapered diameter and, typically, wall thickness, for supporting the nacelle 310 and rotor (not shown). The tower 320 is modified for storing a pressurized gas by including a top end cap 322 and a lower end cap 328, which sealably engage (e.g., are welded or the like) the interior surface of the tower wall 320. Together, the tower 320 and caps 322, 328 define an in-tower storage 324. The upper cap 322 is positioned relatively close to the top of the tower 320 (such as 20 meters or less from the nacelle 320 and more preferably 10 meters or less from the nacelle 320) while the lower cap 328 is positioned a distance (such as 3 to 10 meters or more) above the tower foundation or tower base such that there remains a volume for housing control (not specifically shown in FIG. 3) and other equipment.

The transmission line 314 is run along the central axis of the tower 320, which allows the use of standard power transmission cables typically used with wind turbines. To this end, a pipe 330 is provided that passes through the end caps 322, 328 and the in-tower storage 324 to provide a passage for the line 314. The pipe 330 or other conduit is selected to resist the anticipated pressures within the in-tower storage 324, such as 10 to 15 atm or higher. A seal is, of course, provided between the pipe 330 and each cap 322, 328, such as by providing a weld seal. In the exemplary system 300, a nickel hydrogen battery (or other hydrogen-based battery) 350 is provided in the tower equipment space 340 below the end cap 328. The battery 350 is connected to the DC bus 332 (and/or control switch(es) not shown) and is piped to the hydrogen store 324 via line 352. During operation, the battery 350 is charged from generator 312 via bus 332, and during charging, the battery 350 discharges hydrogen into store 324. Also, during operation, the battery 350 may be selectively discharged to provide electricity to DC bus 332 and connected to grid interface 370 to provide dispatchable power to a user or grid. During discharge, the battery 350 reabsorbs hydrogen previously stored in the tower storage 324.

Figure 4:
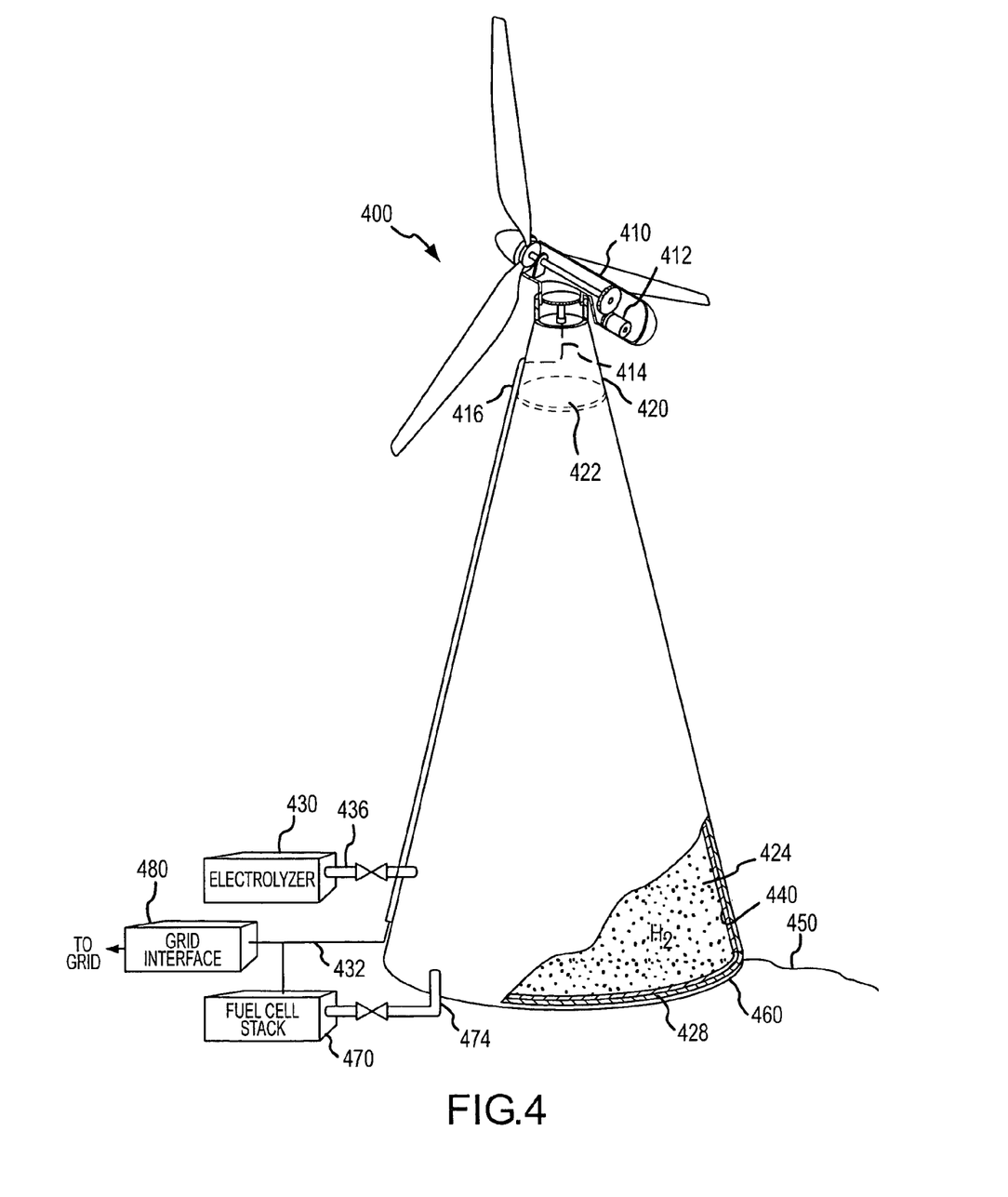
FIG. 4 illustrates yet another embodiment of a wind turbine tower according to the present invention that varies from those of FIGS. 2 and 3 by including an in-tower hydrogen storage system that extends to the bottom of the tower, thereby utilizing the tower foundation for resisting forces generated by stored, high pressure hydrogen.

Because cost is a prime motivator for designing a tower for hydrogen storage, an alternate system 400 as shown in FIG. 4 may be implemented in some cases to eliminate or reduce the cost associated with a lower end cap. As shown, the system 400 includes a hub 410 housing a generator 412. A tower 420 supports the hub 410. The transmission line 414 is initially run within the tower 420 but after a relatively short distance is run along the exterior of the tower 420 in a conduit 416 mounted on an exterior surface of the tower 420.

To reduce storage costs, the tower 420 is configured for using the tower foundation 460, i.e., a concrete pad on soil 450, to provide the structural strength to resist internal pressures. As shown, the system 400 includes an in-tower storage 424 that is defined by an upper end cap 422 welded or otherwise affixed to the interior of the tower 420 proximal to the hub 410 and by the foundation 460 or base of the tower 420. To provide a seal between the concrete foundation 460 and stored hydrogen, the system 400 may include an end plate or end seal 428 which mates with an interior surface of the tower 420 adjacent the foundation 460. In one embodiment, the plate 428 is a thin piece of metal such as steel that is placed in contact with the upper surface of the foundation 460 and then welded to the tower to provide a seal about the inner circumference of the tower base. The plate 428 only acts as a sealing surface and is not designed to bear the load created by the stored, pressurized hydrogen which is carried by the foundation 460, and as such, can be much thinner than an end cap (such as caps 228, 328), thereby reducing storage related costs.

This concept provides greater storage capacity than the systems of FIGS. 2 and 3 but also creates a large bending moment on the foundation 460. The pressurized hydrogen pushes down on the foundation 460 and the bolts mounting the tower 420 to the foundation 460 must resist the forces attempting to pull them up out of the foundation 460. Further, the energy storage and conversion equipment, control equipment that typically would be stored within the tower have to be stored elsewhere, such as in a structure adjacent the tower 420 as suggested in FIG. 4, in the hub 410, or elsewhere.

Further, in some cases, a bladder or liner 440 may be provided, such as a Mylar liner or liner fabricated from another material that is substantially nonporous to hydrogen, to provide a barrier between the hydrogen and the tower and cap 422 and plate 428 to maintain the purity of the hydrogen and to reduce risks associated with hydrogen corrosion. As with the plate 428, the liner 440 is not designed for bearing loads and can be relatively thin. In some embodiments (not shown), the plate 428 may be eliminated and the bladder 440 in combination with the foundation 460 may be used to define the lower or bottom end of the hydrogen storage 424. Also, although not shown, seal elements may be added as necessary to provide sealing surfaces at joints in the portion of the tower 420 that defines the in-tower hydrogen storage 424. For example, metal plates may be welded about the inner circumference of the tower at flanged joints within the storage 424.

In the system 400, an electrolyzer 430 is provided along with a fuel cell stack 470. The electrolyzer 430 and fuel cell stack 470 are connected to the DC bus 432 of system 400 and are also piped to the hydrogen store 424 via piping and valves 436, 474, respectively. The bus 432 is, in turn, connected to the grid interface 480 to provide DC power to the grid (or an end user). During operation, the generator 410 provides DC on the bus 432 which is transmitted to the grid interface 480 and to the electrolyzer 430 (concurrently in a selectable ratio or separately). The electrolyzer 430 operates to convert water into hydrogen and oxygen using the electricity from bus 432, and the hydrogen is output via line 436 to in-tower hydrogen storage 424 (such as at 10 to 15 atm which is below the transition pressure for most if not all conventional towers designs). When the generator 412 is not operating or when the grid demands more energy or at other selectable times, the fuel cell 470 is utilize the stored hydrogen in store 424 via line 474 to generate electricity, which is transmitted via bus 432 to grid interface 480.

Figure 5:
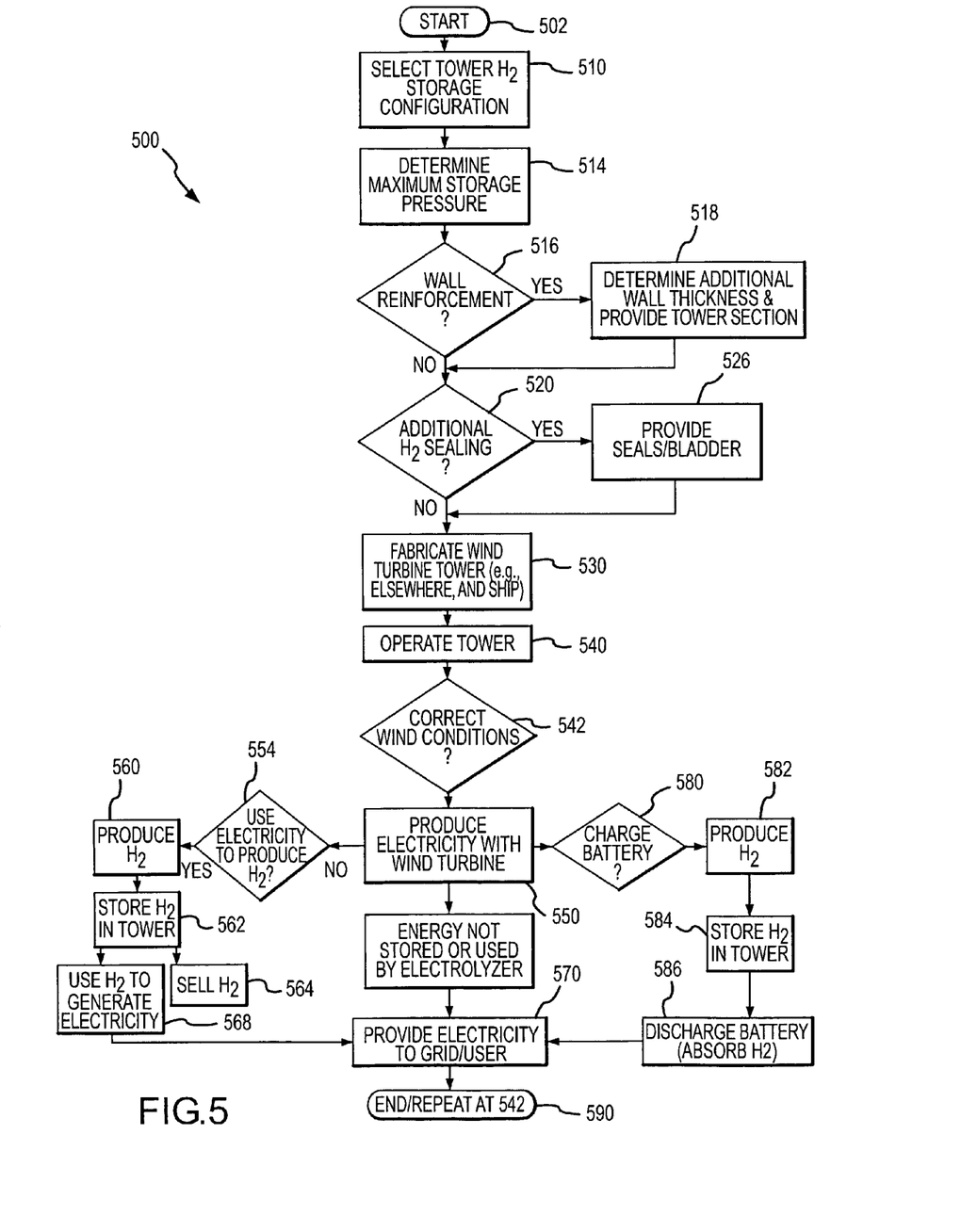
FIG. 5 is a flow chart showing exemplary processes for designing, manufacturing, and operating a wind turbine tower with in-tower hydrogen storage according to the present invention.

FIG. 5 provides a method 500 for designing, fabricating, and operating a wind turbine tower system according to the present invention. The method starts at 502, and at this point it may be worthwhile to note that the concepts of the invention including method 500 may be and likely will be applied to a wind farm with many tower systems. In these cases, each tower may be configured differently and considered separately, but more likely their functionality will be considered in the aggregate. Specifically, it may be desirable to utilize all the towers with similar configurations or if less storage capacity is required to modify a subset of the farm tower for providing the storage for other non-storage towers. The non-storage towers may still be used for producing hydrogen (or at least providing power to a centralized or shared electrolyzer) or for storing energy via a shared battery. In this manner, the storage cost would be less as a subset if the towers could be configured for full capacity in-tower storage rather than providing less than full capacity storage in a number of towers in the farm.

The method 500 continues at 510 with the selection of a hydrogen storage configuration for a particular tower, i.e., a conical steel tower or other tower being used to support a hub/rotor. For example, the tower may be configured according to one of the embodiments shown in FIGS. 2-4 for in-tower hydrogen storage having a desired volume, which dictates at least partially the positioning of the end caps. At 514, the transition or cross over pressure is determined for the tower as was discussed in detail above to maintain the tower as limited by fatigue rather than burst requirements. The maximum pressure for storing hydrogen is set at or below this transition pressure for the tower. Next, at 516, it is determined whether the tower walls require additional reinforcement. For example, it may be desirable as described earlier to retain the fatigue specifications of a tower at levels expected of a tower not being used for internal storage of pressurized gas. In these cases, reinforcement may be determined necessary at 516 and at 518, an additional wall thickness is determined. Also, at 518, the tower sections at the desired wall thickness are formed or provided.

At 520, it is determined whether the tower will require additional sealing to provide in-tower storage of hydrogen. If so, the additional sealing elements are fabricated or otherwise provided at 526. The additional "sealing" elements may include a bladder, such as a Mylar lining or the like, that may be used to provide a barrier between the inner surfaces of the tower and caps and any stored hydrogen. If so, that liner is designed and fabricated for delivery to the site where the tower is to be erected. At 530, the wind turbine tower system is fabricated, which would generally include laying a foundation, erecting the tower, welding the end caps and any addition seals inside the tower, placing an optional liner, affixing the nacelle and rotor with associated generator and other equipment, running a transmission line along with any conduit, providing maintenance access, and positioning and connecting all energy storage and conversion equipment and transmission equipment within or near the tower (see, for example, FIGS. 1-4).

At 540, operation of the tower system is initiated which may include linking the system to a utility grid and if hydrogen is to be sold via a pipeline connecting the in-tower storage to a pipeline (see, FIG. 1, for example). At 542, it is determined if wind conditions are correct for operating the turbine to generate electricity. If so, the method 500 continues at 550 with the production of electricity which is transmitted on a transmission line from the generator to, typically, a DC bus where it may be selectively transmitted/used for producing hydrogen, for storing in a battery, or for transmittal to a grid or end user (not shown specifically but assumed to be part of step 550).

At 554, it is determined whether or not to use the generated electricity to produce hydrogen, and if so, at 560, hydrogen is produced typically with an electrolyzer. The produced hydrogen is stored at 562 within the in-tower hydrogen storage. The stored hydrogen is either sold for fuel or other uses at 564 or used to generate electricity at 568. For example, step 568 may be performed when the wind is not blowing or when a user or grid demands more energy than is being produced by the generator, and the electricity is generated with a fuel cell or a hydrogen combustion device. In this regard, at 570, the generated electricity is shown to be provided to the grid or end user. The sold hydrogen is typically transmitted via pipeline to distribution stations or may be transferred via truck, train, or the like and in either case, is discharged from the in-tower storage or tower storage tank.

At 580, it is determined to store energy by charging a battery, such as a nickel hydrogen battery or the like. During charging, at 582, hydrogen is produced by the battery and at 584 the hydrogen is stored in the in-tower hydrogen storage. At 586, the battery is selectively discharged which results in at least some of the hydrogen stored in the in-tower hydrogen storage being withdrawn and absorbed by the battery. Again, at 570, the discharged electricity from the battery is provided to the grid or an end user. The method 500 ends at 590 or is repeated at 542. The energy storage provided by the hydrogen and/or battery for each such system would likely be measurable in the tens of hours and hence, generally, can be thought of as providing useful but relatively short term energy storage. In other words, the stored energy would be equivalent to 10 to 40 hours or more of energy produced by the generator during peak operation. This stored energy could then be used to replace or supplement the generator when the generator is not available (i.e., the wind is not blowing at useful speeds or maintenance is being performed or the like) or when the grid is demanding more energy. Also, dispatchability is improved because the grid may demand less energy and in this case, steps 554-562 and/or 580-584 may be performed to store energy until a later time when more energy is demanded (i.e., the grid again demands full capacity of the generator).

The above disclosure sets forth a number of embodiments of the present invention. Other arrangements or embodiments, not precisely set forth, could be practiced under the teachings of the present invention and as set forth in the following claims. For example, any of the systems 200, 300, 400 may include one or more discharge systems for discharging hydrogen from the in-tower hydrogen storages for use as fuel. Further, components of the systems 200, 300, 400 may be mixed and matched as desired to create a useful system of storing energy as chemical energy as hydrogen or in a battery and for converting that stored energy back into electricity for use (such as on a utility grid).

I claim:

1. A wind turbine tower assembly for storing compressed gas, comprising:
    a wind turbine assembly comprising a rotor, a generator linked to the rotor, and a nacelle housing the generator;
    a structural foundation; and
    a tubular tower having a first end mounted to the foundation and a second end supporting the nacelle; and
    an in-tower storage provided within the tower configured for storing a pressurized gas and defined in part by inner surfaces of the tower;
    wherein the in-tower storage comprises an upper end cap proximal to the second end of the tower and sealed about its circumference to an inner surface of the tower wall;
    wherein the in-tower storage further comprises a lower end cap proximal to the first end of the tower and sealed about its circumference to an inner surface of the tower wall; and
    wherein the in-tower storage further comprises a liner forming a substantially gas impermeable barrier between the tower wall and the end caps and a gas stored in the in-tower storage.

2. The wind turbine tower assembly of claim 1, wherein the tower wall in the in-tower storage further comprises mechanical joints and in-tower storage comprises sealing elements at each of the mechanical joints providing a gas tight seal.

3. The wind turbine tower assembly of claim 1, further comprising an electrical transmission line connected to the generator, and wherein the in-tower storage further comprises an elongate transmission line guide extending through and between the end caps, a gas tight seal provided between the guide and each of the caps.

4. The wind turbine tower assembly of claim 1, wherein the lower end cap comprises a seal element abutting the foundation and providing a circumferential seal at the first end of the tower proximal the foundation.

5. The wind turbine tower assembly of claim 1, wherein the wall thickness of the tower at least adjacent the in-tower storage is reinforced such that the wall thickness is greater that a wall thickness of a conventional tower used to support the wind turbine assembly without the in-tower storage.

6. A wind turbine tower system for storing hydrogen and energy, comprising:
    a wind turbine assembly comprising a rotor, a generator linked to the rotor, and a nacelle housing the generator;
    a tower connected at an upper end to the nacelle, the tower comprising a wall with a circular cross section; and
    an in-tower hydrogen storage comprising a top end cap within the tower sealably attached to the wall a first distance from the upper end of the tower and a bottom end cap within the tower sealably attached to the wall a second distance greater than the first distance from the upper end of the tower, the top end cap, the bottom end cap, and inner surfaces of the wall between the top and bottom end caps defining a gas storage volume for storing hydrogen.

7. The system of claim 6, wherein the wind turbine assembly further comprises a wind turbine power converter comprising a generator interface converting energy generated by the generator to direct current (DC), a DC bus connected to the generator interface, and a grid interface converting DC on the DC bus to alternating current (AC) for a grid connected to the grid interface, and the system further comprising an energy storage and conversion system connected to the DC bus.

8. The system of claim 7, wherein energy storage and conversion system comprises a battery operable to be charged to store energy from the DC bus and to be discharged to transmit energy to the DC bus, the battery outputting hydrogen when charging to the in-tower hydrogen storage and absorbing hydrogen from the in-tower hydrogen storage when discharging.

9. The system of claim 8, wherein the battery comprises a nickel hydrogen battery.

10. The system of claim 7, wherein the energy storage and conversion system comprises an electrolyzer and a fuel cell or combustion device selectively connected to the DC bus and selectively connected to the in-tower hydrogen storage and wherein the electrolyzer is operable when connected to the DC bus to generate hydrogen for storage in the in-tower hydrogen storage and the fuel cell or combustion device is operable when connected to the DC bus to input hydrogen from the in-tower hydrogen storage and convert the input hydrogen to energy applied to the DC bus.

11. The system of claim 6, further comprising a hydrogen discharge system connected to the in-tower hydrogen storage and connected to a hydrogen transmission pipeline, wherein the hydrogen discharge system operates to selectively discharge hydrogen stored in the in-tower hydrogen storage to the hydrogen transmission pipeline.

12. The system of claim 6, wherein the first distance is less than about 20 meters and the second distance is selected such that bottom end cap is about 3 meters or more above a tower foundation that abuts a lower end of the tower.

13. A wind turbine tower assembly for storing compressed gas, comprising:
    a wind turbine assembly comprising a rotor, a generator linked to the rotor, and a nacelle housing the generator;
    a structural foundation; and
    a tubular tower having a first end mounted to the foundation and a second end supporting the nacelle;
    an in-tower storage provided within the tower configured for storing a pressurized gas and defined in part by inner surfaces of the tower, wherein the in-tower storage comprises an upper end cap proximal to the second end of the tower and sealed about its circumference to an inner surface of the tower wall and wherein the in-tower storage further comprises a lower end cap proximal to the first end of the tower and sealed about its circumference to an inner surface of the tower wall; and
    an electrical transmission line connected to the generator, and wherein the in-tower storage further comprises an elongate transmission line guide extending through and between the end caps, a gas tight seal provided between the guide and each of the caps.

14. The assembly of claim 1, wherein the wind turbine assembly further comprises a wind turbine power converter comprising a generator interface converting energy generated by the generator to direct current (DC), a DC bus connected to the generator interface, and a grid interface converting DC on the DC bus to alternating current (AC) for a grid connected to the grid interface, and the system further comprising an energy storage and conversion system connected to the DC bus.

15. The system of claim 14, wherein energy storage and conversion system comprises a battery operable to be charged to store energy from the DC bus and to be discharged to transmit energy to the DC bus, the battery outputting hydrogen when charging to the in-tower hydrogen storage and absorbing hydrogen from the in-tower hydrogen storage when discharging.

16. The system of claim 15, wherein the battery comprises a nickel hydrogen battery.

17. The system of claim 14, wherein the energy storage and conversion system comprises an electrolyzer and a fuel cell or combustion device selectively connected to the DC bus and selectively connected to the in-tower hydrogen storage and wherein the electrolyzer is operable when connected to the DC bus to generate hydrogen for storage in the in-tower hydrogen storage and the fuel cell or combustion device is operable when connected to the DC bus to input hydrogen from the in-tower hydrogen storage and convert the input hydrogen to energy applied to the DC bus.

18. The system of claim 14, further comprising a hydrogen discharge system connected to the in-tower hydrogen storage and connected to a hydrogen transmission pipeline, wherein the hydrogen discharge system operates to selectively discharge hydrogen stored in the in-tower hydrogen storage to the hydrogen transmission pipeline.

* * * * *